(12) United States Patent
Nakajima et al.

(10) Patent No.: US 10,701,344 B2
(45) Date of Patent: Jun. 30, 2020

(54) INFORMATION PROCESSING DEVICE, INFORMATION PROCESSING SYSTEM, CONTROL METHOD OF AN INFORMATION PROCESSING DEVICE, AND PARAMETER SETTING METHOD

(71) Applicant: SEIKO EPSON CORPORATION, Tokyo (JP)

(72) Inventors: Yasumasa Nakajima, Shiojiri (JP); Hiroshi Matsushita, Matsumoto (JP); Senichi Mokuya, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/780,148

(22) PCT Filed: Nov. 21, 2016

(86) PCT No.: PCT/JP2016/084425
§ 371 (c)(1),
(2) Date: May 30, 2018

(87) PCT Pub. No.: WO2017/094543
PCT Pub. Date: Jun. 8, 2017

(65) Prior Publication Data
US 2018/0367787 A1    Dec. 20, 2018

(30) Foreign Application Priority Data

Dec. 2, 2015  (JP) ................................ 2015-235452
Mar. 24, 2016 (JP) ................................ 2016-059671

(51) Int. Cl.
*H04N 13/275* (2018.01)
*H04N 7/14* (2006.01)
(Continued)

(52) U.S. Cl.
CPC .......... *H04N 13/275* (2018.05); *G06T 17/00* (2013.01); *G09G 5/363* (2013.01); *H04N 7/142* (2013.01);
(Continued)

(58) Field of Classification Search
CPC combination set(s) only.
See application file for complete search history.

(56) References Cited

U.S. PATENT DOCUMENTS 6,195,116 B1 * 2/2001 Lee .................... H04N 7/147
                                                        348/14.09
9,332,218 B2 * 5/2016 Smith .................. G06T 17/00
(Continued)

FOREIGN PATENT DOCUMENTS

JP    H05-22722 A    1/1993
JP    H07-182535 A   7/1995
(Continued)

OTHER PUBLICATIONS

Yatsuduka, Eri, "Keys to Successful Telework," ITmedia, Mar. 24, 2015, [http://www.itmedia.co.jp/enterprise/articles/1503/24/news011.html].

(Continued)

*Primary Examiner* — Duc Nguyen
*Assistant Examiner* — Assad Mohammed
(74) *Attorney, Agent, or Firm* — Oliff PLC

(57) ABSTRACT

Technology to display images with presence on a display device while reducing data communication volume. An information processing device includes: a communicator; a multiple viewpoint image generator configured to, based on a three-dimensional model of a subject the communicator receives from an external device, generate a display image including a viewpoint image corresponding to the perspective of multiple viewpoints; and a display controller config- (Continued)

ured to display the display image on a multiple viewpoint display device that displays images corresponding to multiple viewpoints.

4 Claims, 16 Drawing Sheets

(51) Int. Cl.
| | |
|---|---|
| *H04N 13/25* | (2018.01) |
| *G09G 5/36* | (2006.01) |
| *H04N 13/239* | (2018.01) |
| *H04N 13/156* | (2018.01) |
| *H04N 13/117* | (2018.01) |
| *G06T 17/00* | (2006.01) |
| *H04N 13/305* | (2018.01) |
| *H04N 13/351* | (2018.01) |
| *H04N 7/15* | (2006.01) |
| *H04N 13/00* | (2018.01) |
| *G09G 3/00* | (2006.01) |

(52) U.S. Cl.
CPC ............... *H04N 7/147* (2013.01); *H04N 7/15* (2013.01); *H04N 13/117* (2018.05); *H04N 13/156* (2018.05); *H04N 13/239* (2018.05); *H04N 13/25* (2018.05); *H04N 13/305* (2018.05); *H04N 13/351* (2018.05); *G09G 3/003* (2013.01); *G09G 2320/0693* (2013.01); *G09G 2360/16* (2013.01); *H04N 2013/0081* (2013.01); *H04N 2013/0092* (2013.01)

(56) References Cited

U.S. PATENT DOCUMENTS

| | | | |
|---|---|---|---|
| 9,438,891 B2 | 9/2016 | Mannion et al. | |
| 2013/0044191 A1* | 2/2013 | Matsumoto | H04N 13/221 348/50 |
| 2013/0181979 A1 | 7/2013 | Tsukagoshi et al. | |
| 2014/0098183 A1* | 4/2014 | Smith | H04N 7/157 348/14.16 |
| 2014/0104368 A1* | 4/2014 | Tan | H04N 7/147 348/14.07 |
| 2015/0049011 A1* | 2/2015 | Mankowski | G06F 3/01 345/156 |

FOREIGN PATENT DOCUMENTS

| | | |
|---|---|---|
| JP | 2009-92786 A | 4/2009 |
| JP | 2013-025106 A | 2/2013 |
| JP | 2013-74598 A | 4/2013 |
| JP | 2014-072880 A | 4/2014 |

OTHER PUBLICATIONS

"Super Realistic Telework Office," ITmedia, Jul. 16, 2015, [http://www.itmedia.co.jp/enterprise/articles/1507/16/news047 html].

Feb. 14, 2017 International Search Report issued International Patent Application No. PCT/JP2016/084425.

* cited by examiner

INFORMATION PROCESSING DEVICE, INFORMATION PROCESSING SYSTEM, CONTROL METHOD OF AN INFORMATION PROCESSING DEVICE, AND PARAMETER SETTING METHOD

TECHNICAL FIELD

The present invention relates to technology enabling presenting a display image based on a three-dimensional model.

BACKGROUND

As a method of improving the sense of real presence in a video conference, PTL 1 describes technology for generating a three-dimensional image of a space on the imaging side, and displaying on a display device a two-dimensional image corresponding to the viewpoint of the display side from the three-dimensional image. Technology for displaying an image photographed from multiple directions according to the direction in which the listener is looking in order to converse as though the eyes of the listener and the other party meet is also known from the literature (see, for example, PTL 2). A stereoscopic display viewable by multiple people from any direction is also known from the literature (see, for example, PTL 3).

CITATION LIST

Patent Literature

[PTL 1] JP-A-2014-72880
[PTL 2] JP-A-H5-22722
[PTL 3] JP-A-2009-92786

SUMMARY OF INVENTION

Technical Problem

With the technology according to PTL 1, when multiple participants are looking at the display screen, the multiple participants on the display side will be looking at the same display screen. As a result, it is difficult for a specific participant on the display side to meet the eyes of a participant on the imaged side.

The technology described in PTL 1 and PTL 2 is also silent regarding a specific method of adjustment to align the lines of sight of particular participants through the display screen in a video conference. Furthermore, video must be sent between remote conference rooms in the case of a video conference, and exchanging video recorded from multiple directions as described in PTL 2 requires a high data transfer speed, data volume, and other communication specifications for video conferencing, potentially increasing communication costs. Furthermore, in order to match the lines of sight of a specific participant on the imaged side and a specific participant on the display side, the related technology requires adjusting the lines of sight to account for the participants' movements up and down as well as the participants' horizontal movements right and left. The technology described in PTL 1 and PTL 2 also requires setting the camera according to the eye height of the subject, and adapting flexibly to various situations (such as differences in the height of the participants and whether the participants are standing or sitting) may be difficult. Furthermore, if multiple stereoscopic displays disclosed in PTL 3 are used in situations requiring two-way data communication such as video conferences, costs increase, assuring space sufficient for the stereoscopic displays may be difficult, and other structural problems may result.

As a result, technology enabling reducing data communication volumes and displaying images with presence on a display device is desirable. Reducing cost, resource conservation, simplified manufacturing, and improved ease of use are also desirable considering the state of the related art.

Solution to Problem

The present invention is directed to solving at least part of the foregoing problems, and can be embodied as described in the following embodiments and examples.

(1) An information processing device is provided as one aspect of the invention. This information processing device includes: a communicator; a multiple viewpoint image generator configured to, based on a three-dimensional model of a subject the communicator receives from an external device, generate a display image including a viewpoint image corresponding to the perspective of multiple viewpoints; and a display controller configured to display the display image on a multiple viewpoint display device that displays images corresponding to multiple viewpoints.

Based on a three-dimensional model of a subject, this configuration can generate viewpoint images appropriate to multiple different viewpoints, and display a display image including the viewpoint images on a multiple viewpoint display device, and can thereby present a display image with realistic presence. Furthermore, by generating the viewpoint image based on a received three-dimensional model, the data communication volume can be reduced compared with a configuration that receives a viewpoint image for each of multiple different viewpoints.

(2) The foregoing information processing device may also have storage configured to store a parameter used to generate the viewpoint image according to the multiple viewpoints; the multiple viewpoint image generator generating the viewpoint image based on the parameter stored in the storage.

This configuration can easily generate viewpoint images based on the parameters.

(3) The information processing device described above, wherein the parameter includes rotation angle information set according to the multiple viewpoints to rotate the three-dimensional model.

This configuration can easily generate viewpoint images based on a three-dimensional model using rotation angle information.

(4) The information processing device described above may also have a parameter setting unit configured to set the rotation angle information based on an image of a subject the display controller displayed on the multiple viewpoint display device independently of the multiple viewpoints.

This configuration can easily set the rotation angle information based on a subject image.

(5) The information processing device described above, wherein the communicator receives a background image of the subject; the multiple viewpoint image generator generates a synthesized image of the background image and the viewpoint image; and the display controller displays the synthesized image as the display image on the multiple viewpoint display device.

This displays a synthesized image of the background image and viewpoint image on the multiple viewpoint display device, and therefore can present a display image with greater presence.

(6) An information processing device is provided by another aspect of the invention. This information processing device includes a communicator; a multiple viewpoint image generator configured to, based on a three-dimensional model of a subject the communicator receives from an external device, generate a display image including a viewpoint image corresponding to the perspective of multiple viewpoints; a display controller configured to display the display image on a multiple viewpoint display device that displays images corresponding to multiple viewpoints; an imaging controller configured to acquire images of imaged subjects captured by multiple imaging devices; and a three-dimensional model generator configured to generate a three-dimensional model of the imaged subjects based on the images the multiple imaging devices captured; the communicator sending a three-dimensional model of the imaged subjects to an external device.

This configuration can generate and send to an external device a three-dimensional model of an imaged subject based on a picture that was taken.

(7) The information processing device described above may also have an extractor configured to extract a background image that is a background of the imaged subject from the images captured by the multiple imaging devices; the communicator transmitting the background image to an external device.

This configuration can extract and send to an external device a background image.

(8) The information processing device described above, wherein the imaging controller can acquire depth information detected by a depth sensor disposed to each of the multiple imaging devices; and the three-dimensional model generator generates a three-dimensional model of the imaged subject based on images captured by each of the multiple imaging devices, and depth information detected by the multiple depth sensors.

This configuration can easily generate a three-dimensional model of an imaged subject based on a captured image and depth information.

(9) According to another aspect of the invention is provided a method of setting parameters used when generating a display image including a viewpoint image corresponding to the perspective of multiple viewpoints based on a three-dimensional model of a subject. The setting method includes (a) a step of displaying an image of a subject on a display device independently of the multiple viewpoints; and (b) a step of setting rotation angle information for rotating the three-dimensional model according to the viewpoint based on the image of a subject displayed by step (a).

This configuration can set rotation angle information based on an image of a subject.

(10) In the parameter setting method described above, step (a) includes a step of locating the subject on the second location side so that the direction in which a specific person viewing a first display device and displayed on a second display device different from the first display device, which is the display device disposed in a first location, is facing the subject located on the second location side where the second display device is located; and step (b) includes a step of setting an angle of rotation and direction of rotation of the image of the subject as the rotation angle information, when the subject on the second location side is positioned according to step (a), and the image of a subject is changed so that the image of a subject displayed on the first display device faces the direction of the specific person.

This configuration can easily set rotation angle information by changing the image of the subject.

Another aspect of the invention can be embodied as a device comprising one or more of the communicator, display controller, and multiple viewpoint image generator. More specifically, this device can be configured with or without a communicator. The device can also be configured with or without the display controller. The device can also be configured with or without the multiple viewpoint image generator. Such configurations can resolve at least one of the problems of reducing device size, reducing cost, improving energy efficiency, simplifying manufacture, and improving ease of use. In addition, one or all of the technical features of the information processing device or the parameter setting method described above can be applied to this device or method.

Note that the invention can be embodied in many ways, and in addition to an information processing device and a parameter setting method, can be embodied as an information processing system including the information processing device, a control method of an information processing device, a computer program for implementing the functions of the method, device, and system, and as a storage medium storing the computer program.

DESCRIPTION OF EMBODIMENTS

A. Embodiments

A-1: Configuration of an Image Communication System

Figure 1:
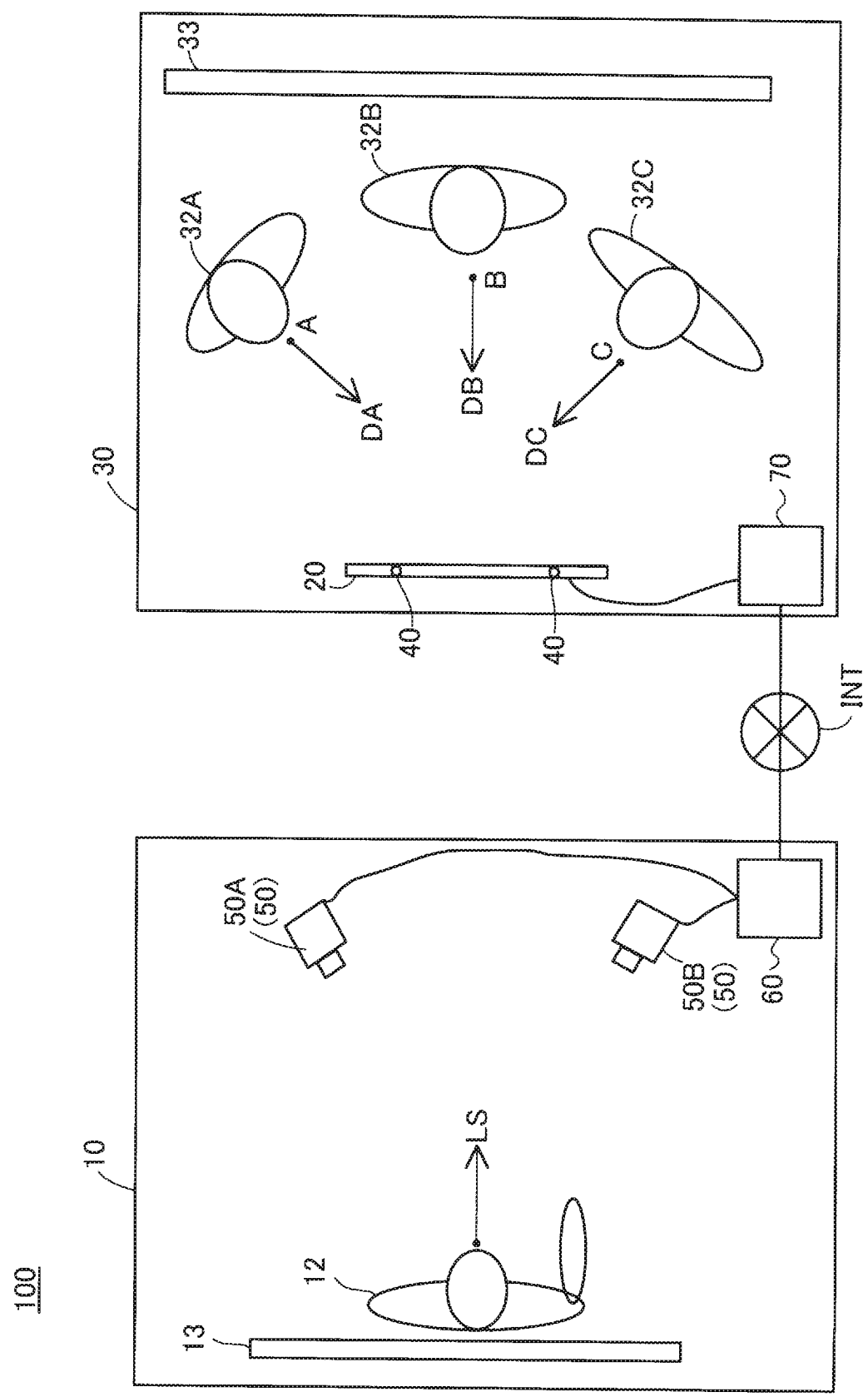
FIG. 1 illustrates an image communication system according to an embodiment of the invention.

FIG. 1 illustrates an image communication system 100 according to an embodiment of the invention. The image communication system 100 is a system (video conferencing system) for sending and receiving video and audio by data communication in real time between different locations 10, 30, such as conference rooms. Video is displayed on a display screen by sending frame images of a video stream at a frame rate of 30 frames per second, for example, to the location of the other party. Note that the frame images of the transmitted video stream may be transmitted by sending only the difference with the frame image of the preceding frame.

The data communication functions (data transmission function and data reception function) of the image communication system 100 are the same at location 10 and location 30. However, to simplify the description below, only the parts related to the data transmission function are shown at location 10, and only the parts related to the data reception function are shown at location 30, in the figures. As a result, location 10 is referred to below as the transmission side 10, and location 30 is referred to as the reception side 30.

In this image communication system 100, person 12 is attending the meeting on the transmission side 10, and three persons 32A, 32B, 32C are attending on the reception side 30. A whiteboard or other background object 13 is located behind person 12. Likewise, a whiteboard or other background object 33 is located behind persons 32A, 32B, 32C.

In FIG. 1, the conference proceeds with persons 32A, 32B, 32C viewing video including the person 12 on the transmission side 10 displayed on the display screen of the multiple viewpoint display device 20 described below.

The image communication system 100 includes two imaging devices 50A, 50B, and a transmission-side information processing device 60, providing the ability to transmit data. These two imaging devices 50A, 50B and the transmission-side information processing device 60 are disposed on the transmission side 10.

Imaging device 50A is set on the front left side of the person 12, and imaging device 50B is set on the front right side of the person 12. The two imaging devices 50A, 50B image an area including the person 12 from different directions. Note that when not differentiating between the two imaging devices 50A, 50B, they are collectively referred to as imaging devices 50.

The image communication system 100 also includes a receiver-side information processing device 70 providing the ability to receive data. The receiver-side information processing device 70 is disposed on the reception side 30.

The image communication system 100 also has a multiple viewpoint display device 20 for displaying images generated by the receiver-side information processing device 70; and two speakers 40 for outputting audio transmitted from the transmission-side information processing device 60 on the transmission side 10.

The transmission-side information processing device 60 and the receiver-side information processing device 70 can exchange data through the Internet INT. Each person 32A, 32B, 32C on the reception side 30 views the multiple viewpoint display device 20 from a different viewpoint A, B, C and line of sight DA, DB, DC. The viewpoint A, B, C is the location from which the multiple viewpoint display device 20 is viewed, and in this example is the center point between the eyes of each person 32A, 32B, 32C.

In FIG. 1, the image communication system 100 is configured to enable sending and receiving data such as image information and audio information bidirectionally between the transmission side 10 and reception side 30. More specifically, while not shown in the figures, a multiple viewpoint display device 20, receiver-side information processing device 70, and speakers 40 are also disposed on the transmission side 10; and an imaging device 50, transmission-side information processing device 60, and speakers 40 are also disposed on the reception side 30.

Figure 2:
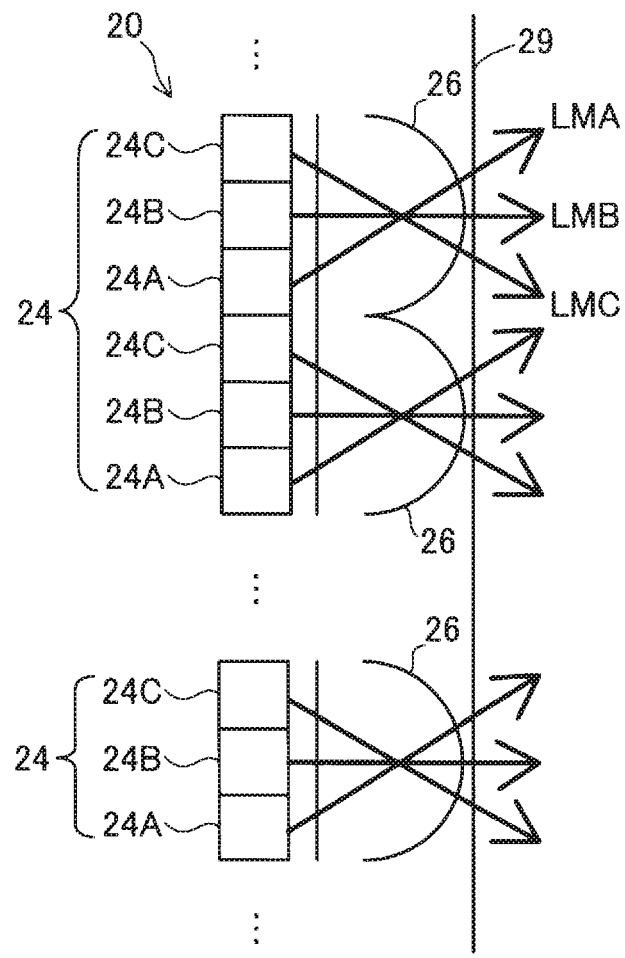
FIG. 2 describes a multiple viewpoint display device.

FIG. 2 is used to describe the multiple viewpoint display device 20. The multiple viewpoint display device 20 displays a two-dimensional image corresponding to multiple different viewpoints A, B, C. The multiple viewpoint display device 20 is a direct-view display device. The multiple viewpoint display device 20 has multiple pixels 24 arranged in a matrix, a lenticular lens 26 disposed on the view side of the multiple pixels 24, and a display screen (screen) 29. The multiple pixels 24 are in three pixel rows 24A, 24B, 24C aligned in the vertical direction (the direction through the paper surface).

Pixel row 24A is used for displaying an image corresponding to viewpoint A (FIG. 1). Pixel row 24B is used for displaying an image corresponding to viewpoint B (FIG. 1). Pixel row 24C is used for displaying an image corresponding to viewpoint C (FIG. 1).

The lenticular lens 26 projects a first image LMA composed of pixel rows 24A, a second image LMB composed of pixel rows 24B, and a third image LMC composed of pixel rows 24C to the different viewpoints A, B, C.

As a result, person 32A sees the first image LMA, person 32B sees the second image LMB, and person 32C sees the third image LMC on the screen of the multiple viewpoint display device 20.

The display screen 29 embodies the surface of the multiple viewpoint display device 20. The display screen 29 in this example is a flat panel (such as a glass panel).

Figure 3:
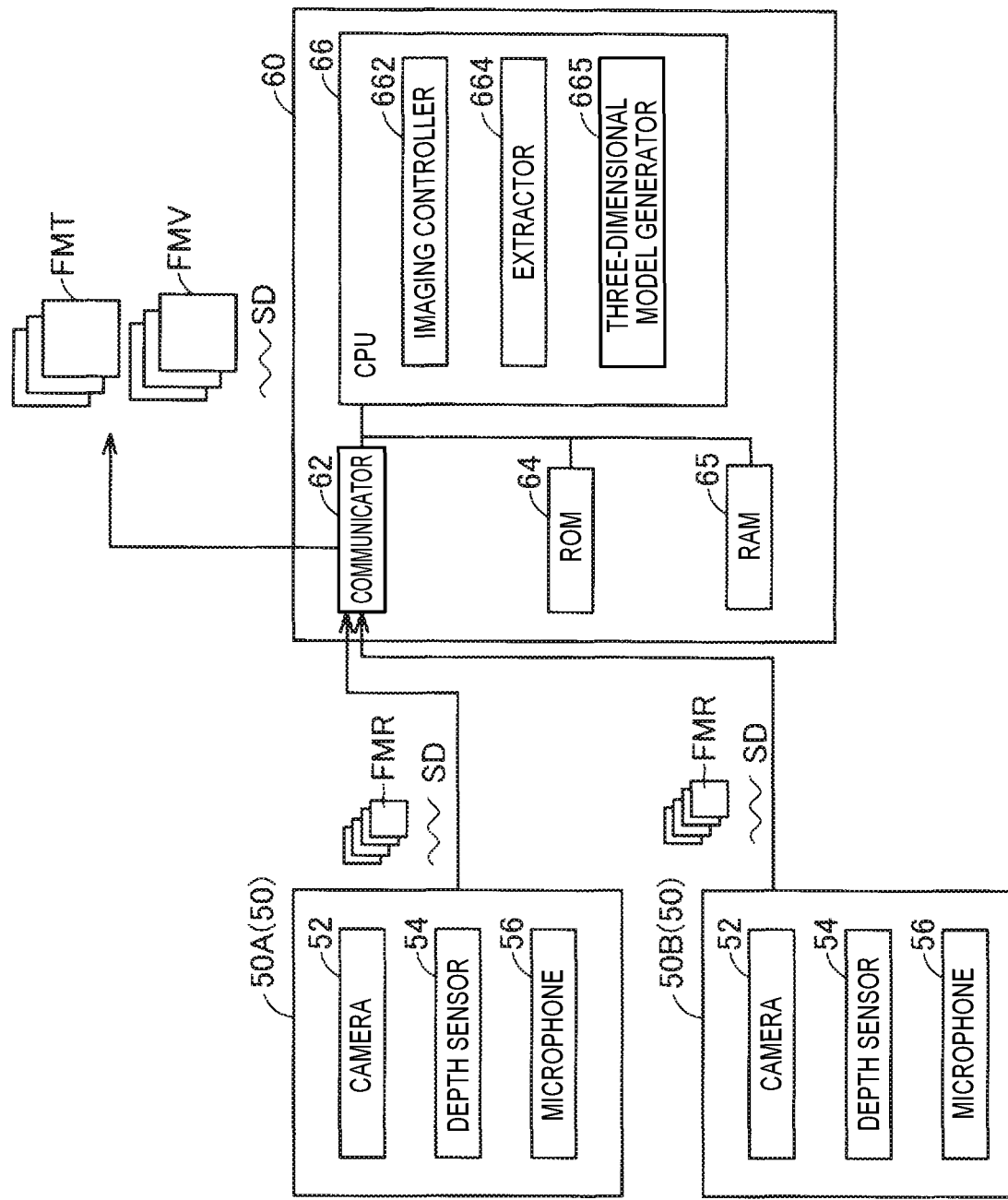
FIG. 3 is a function block diagram of an imaging device and a transmitter-side information processing device.

FIG. 3 is a function block diagram of the imaging device 50 and transmission-side information processing device 60. The imaging device 50 includes a camera 52, depth sensor 54, and microphone 56.

The camera 52 has the function of receiving ambient light and forming images. The captured images are then transmitted as frame images FMR comprising a video stream to the transmission-side information processing device 60. The camera 52 images the area containing the person 12 and background object 13.

The depth sensor 54 detects the distance to the subject imaged by the camera 52. Methods of detecting distance using the depth sensor 54 include, for example, methods (TOF method) of detecting distance based on the time until light emitted from a light source is reflected by the subject and detected by a photodetector, and triangulation methods based on the positions from which a light beam is emitted and received. The depth information representing the distance to the subject detected by the depth sensor 54 is added to the frame images FMR as additional information, and sent to the transmission-side information processing device 60.

The microphone 56 converts sound to an electrical signal. The audio information SD carried by the electrical signal is synchronized to the frame images FMR when transmitted to the transmission-side information processing device 60.

The transmission-side information processing device 60 includes a communicator 62, ROM 64, RAM 65, and a CPU 66 as a controller. The communicator 62, ROM 64, RAM 65, and CPU 66 are interconnected through a bus.

The communicator 62 has an I/O interface conforming to a specific standard such as USB, LAN, Bluetooth®, or IrDA, and sends and receives data. For example, the communicator 62 receives the frame images FMR to which depth information was added and audio information SD from the imaging devices 50. The communicator 62 also sends data to the receiver-side information processing device 70. In this embodiment of the invention, the communicator 62 sends a three-dimensional model FMT of a person and a background image FMV stored in RAM 65 described below, and the audio information SD, to the receiver-side information processing device 70.

The CPU 66 executes processes described below by running programs stored in ROM 64 and loaded into RAM 65. Note that the processes described below are executed by operations based on the programs, and at least part of the programs may be executed by circuits or other hardware configurations.

By executing programs stored in ROM 64, the CPU 66 functions as an imaging controller 662, extractor 664, and three-dimensional model generator 665.

The imaging controller 662 controls the multiple imaging devices 50A, 50B. The imaging controller 662 acquires frame images FMR to which depth information was added, and audio information SD, through the communicator 62. The imaging controller 662 also stores the frame images FMR with added depth information, and the audio information SD, in RAM 65.

The extractor 664 extracts a subject image representing the subject, and a background image representing the background not including the subject, from a frame image FMR. For example, the extractor 664 may extract a person image as the subject image by detecting the edges (a feature quantity) of the person from the frame images FMR. The extractor 664 may also extract, from the data in the frame image FMR, an image of the area not including the person image as the background image FMV. The person image and the background image FMV are stored in RAM 65.

The three-dimensional model generator 665, based on the images captured by the two imaging devices 50A, 50B, generates a three-dimensional model of the person, which is the subject. More specifically, the three-dimensional model generator 665 generates a three-dimensional model FMT based on the depth information acquired from the two imaging devices 50A, 50B at different sampling points, and the frame image FMR (more specifically, the extracted person image). The generated three-dimensional model FMT is then stored in RAM 65. More specifically, the three-dimensional model FMT combines the images acquired from the imaging devices 50A, 50B based on the depth information (triangulation). Data from two directions is synthesized, and surface information including red, green, and blue (RGB) color information is added to the synthesized image (texture mapping). This three-dimensional model generating process is described further below.

Note that the transmission-side information processing device 60 has external storage such as a hard disk drive, and data (such as the three-dimensional model FMT) generated by the CPU 66 may be stored in the external storage.

Figure 4:
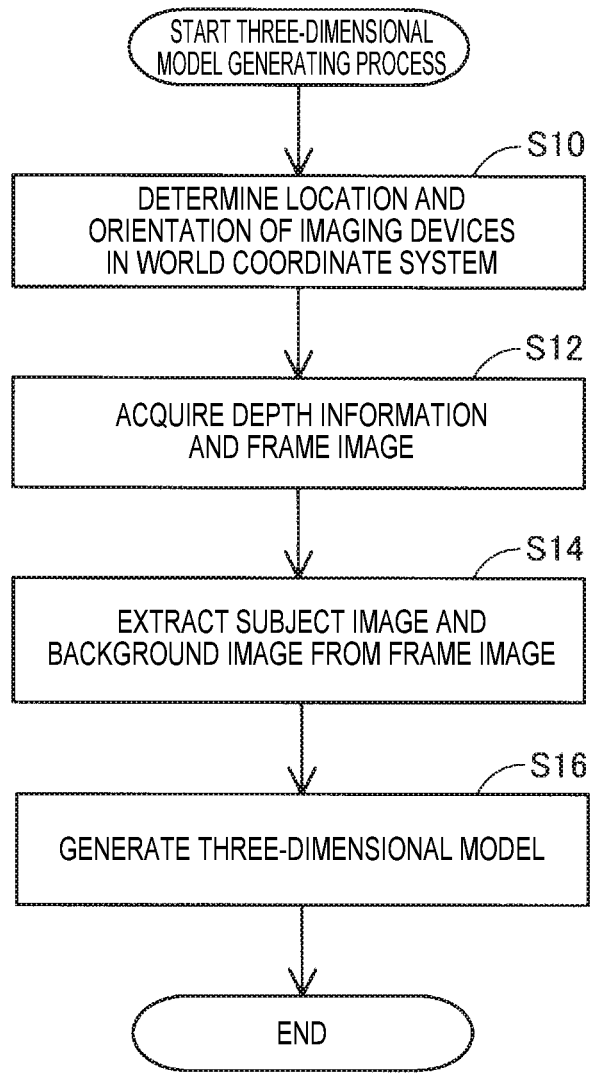
FIG. 4 is a flowchart of a three-dimensional model generating process.

FIG. 4 is a flow chart of the three-dimensional model generating process. First, the CPU 66 identifies the location and orientation (attitude) of the two imaging devices 50A, 50B in a world coordinate system (step S10).

The world coordinate system as used here is a three-dimensional rectangular coordinate system independent of the individual coordinate systems (model coordinate systems) of the of the two imaging devices 50A, 50B. Conversion from this world coordinate system to the coordinate system (viewing coordinate system) for viewing the person that is the subject from a desired viewpoint is done by a viewing transformation. In addition, conversion from a viewing coordinate system to a screen coordinate system for displaying on the multiple viewpoint display device 20 is done by a projective transformation such as a perspective transformation of the person that is the subject in the viewing coordinate system.

If the relative positions and orientations of the two imaging devices 50A, 50B are accurately known, the locations and orientations of the two imaging devices 50A, 50B can be determined in the world coordinate system by defining an appropriate origin. In practice, these can be defined by calibration.

For example, the two imaging devices 50A, 50B are placed in previously defined approximate positions and previously defined approximate attitudes relative to a known target used for calibration. Next, premised on parts of the shape of the known target derived based on the depth information generated by the two depth sensors 54 representing the same area as the known target, the locations and orientations of the imaging devices 50A, 50B, that is, the imaged position, the imaged direction, the sampling point of the depth, and the sampling direction of the depth, are derived.

More specifically, based on the depth information generated by each imaging device 50A, 50B, the actual locations and orientations of the imaging devices 50A, 50B may be mathematically determined in the world coordinate system using a pattern matching method such as ICP (iterative closest point). Once the coordinates of the position of each imaging device 50A, 50B and the unit vector indicating the direction are determined in the world coordinate system, a transformation determinant for converting the coordinate system (model coordinate system) unique to each imaging device to the world coordinate system can be derived. This transformation determinant is stored and used to generate the three-dimensional model described below.

When the CPU 66 receives a command to generate a three-dimensional model from the person 12 by pushing a button, for example, the imaging controller 662 acquires the depth information and frame images FMR from the imaging devices 50A, 50B (step S12). In this embodiment of the invention, the imaging controller 662 acquires frame images FMR with added depth information.

Next, the extractor 664 extracts the subject image and background image from the frame image FMR (step S14). Next, the three-dimensional model generator 665 generates a three-dimensional model based on the depth information acquired from the two imaging devices 50A, 50B (step S16). More specifically, the three-dimensional model generator 665, using the above transformation determinant, identifies a polygon model of the person 12 that is the subject for each depth information value acquired from the imaging devices 50A, 50B in the world coordinate system. The three-dimensional model generator 665 then determines the correlation between each polygon of the polygon model and the RGB image as the frame image FMR for each imaging device 50A, 50B. More specifically, the three-dimensional model generator 665 generates a three-dimensional model FMT by applying the RGB information (color information) as texture to the surface of each polygon of the polygon model.

As described above, the three-dimensional model generator 665 creates a three-dimensional model FMT based on the images captured by two imaging devices 50, and the depth information acquired from the depth sensors 54 of the two imaging devices 50.

Figure 5:
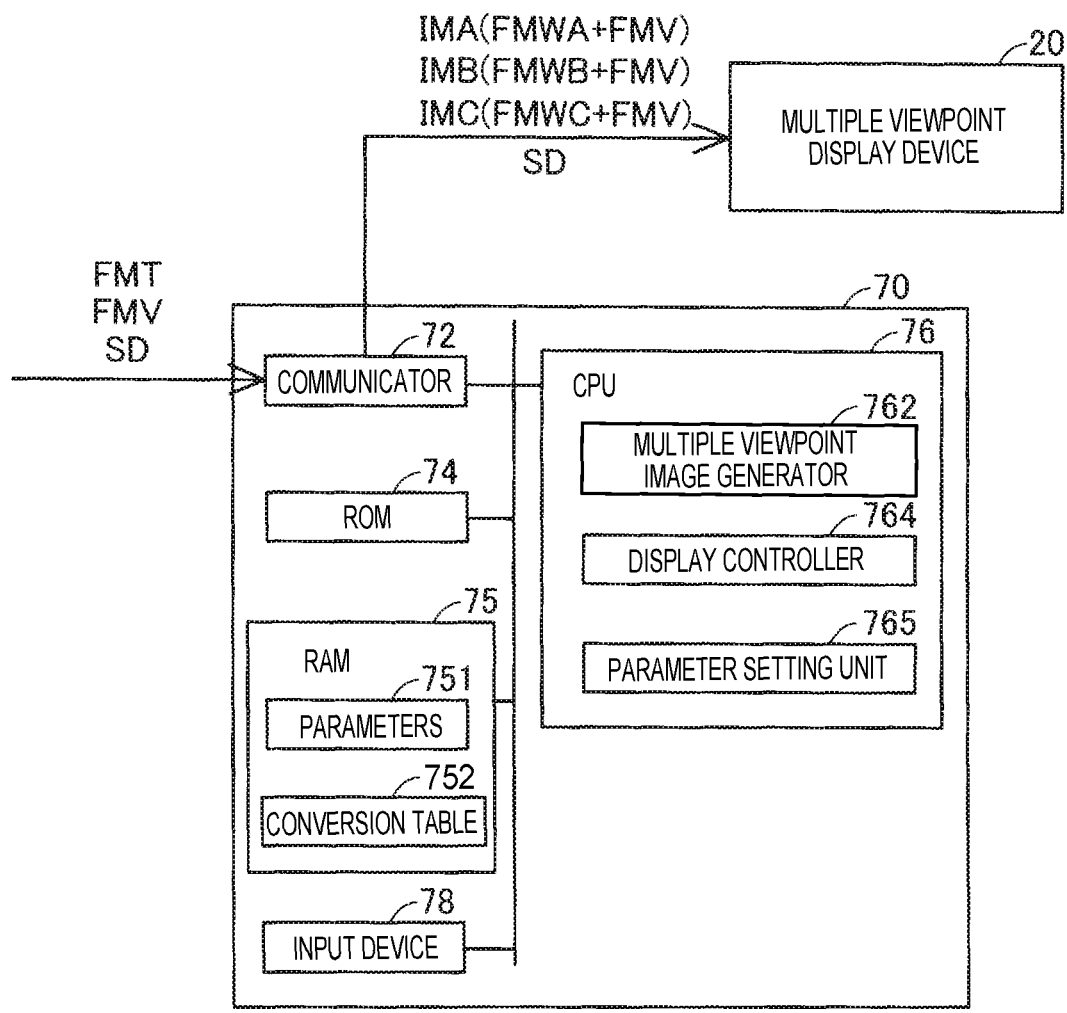
FIG. 5 is a function block diagram of a receiver-side information processing device and a multiple viewpoint display device.

FIG. 5 is a function block diagram of the receiver-side information processing device 70 and multiple viewpoint display device 20. The receiver-side information processing device 70 has a communicator 72, ROM 74, RAM 75, a CPU 76 as a controller, and an input device 78. The communicator 72, ROM 74, RAM 75, CPU 76, and input device 78 are mutually connected through a bus.

The communicator 72 has an I/O interface conforming to a specific standard such as USB, LAN, Bluetooth®, or IrDA, and sends and receives data. For example, the communicator 72 receives the three-dimensional model FMT, audio information SD, and background image FMV transmitted from the transmission-side information processing device 60. The communicator 72 also sends display images IMA, IMB, IMC, and the audio information SD, to the multiple viewpoint display device 20. Note that when not differentiating the display images IMA, IMB, IMC, the display images are collectively referred to as display images IM.

The CPU 76 functions as a multiple viewpoint image generator 762, display controller 764, and parameter setting unit 765 by executing programs stored in ROM 74.

RAM 75 used as a storage device stores parameters 751 used to generate viewpoint images FMWA, FMWB, FMWC corresponding to the multiple viewpoints A, B, C. The parameters 751 are parameters for converting the three-dimensional model FMT in world coordinate system through the viewing coordinate system to the screen coordinate system. These parameters include rotation angle information R for converting coordinates of the three-dimensional model FMT in the world coordinate system to coordinates of the screen coordinate system.

The rotation angle information R expresses the angle of rotation and the direction of rotation relative to a reference line of sight LS in the image of the person 12 displayed on the multiple viewpoint display device 20 on the reception side 30. In this embodiment of the invention, the reference line of sight LS is perpendicular to the display screen 29 of the multiple viewpoint display device 20 (not shown in FIG. 1) of the transmission side 10.

Rotation angle information R is set according to the multiple viewpoints A, B, C. The location of the viewpoints A, B, C in the world coordinate system, and the unit vectors indicating the direction of the line of sight from the viewpoint A, B, C, are set by setting the rotation angle information R. More specifically, by setting the rotation angle information R, the transformation determinant from the world coordinate system (Xw, Yw, Zw) to the viewing coordinate system (X, Y, Z), and the transformation determinant from the viewing coordinate system (X, Y, Z) to the screen coordinate system (x, y), are set by the parameter setting unit 765 using a conversion table 752 stored in RAM 75. Note that below RA indicates the rotation angle information corresponding to viewpoint A, RB indicates the rotation angle information corresponding to viewpoint B, and RC indicates the rotation angle information corresponding to viewpoint C.

The multiple viewpoint image generator 762, based on the three-dimensional model FMT received from the transmission-side information processing device 60, generates viewpoint images FMWA, FMWB, FMWC corresponding to the multiple viewpoints A, B, C. More specifically, the multiple viewpoint image generator 762 generates viewpoint images FMWA, FMWB, FMWC using the transformation determinants set for the multiple viewpoints A, B, C. In addition, the multiple viewpoint image generator 762 produces composite images synthesizing the background image FMV with the viewpoint images FMWA, FMWB, FMWC as the display images IMA, IMB, IMC. Note that when not differentiating therebetween, the viewpoint images FMWA, FMWB, FMWC are referred to as viewpoint images FMW.

The display controller 764 controls the multiple viewpoint display device 20. More specifically, the display controller 764 controls the multiple viewpoint display device 20 to correlate the display images IMA, IMB, IMC containing the viewpoint images FMWA, FMWB, FMWC to the pixel rows 24A, 24B, 24C of the multiple viewpoint display device 20, and display the display images IMA, IMB, IMC in the corresponding pixel rows 24A, 24B, 24C. The display controller 764 controls the multiple viewpoint display device 20 so that the display image IMA containing viewpoint image FMWA is displayed by pixel rows 24A, the display image IMB containing viewpoint image FMWB is displayed by pixel rows 24B, and the display image IMC containing viewpoint image FMWC is displayed by pixel rows 24C.

The parameter setting unit 765 sets the parameters 751 by calibration, and stores them in RAM 75. More specifically, the parameter setting unit 765 sets the rotation angle information R based on an image of the person 12 that is the subject displayed on the multiple viewpoint display device 20 and was converted using a single reference viewing coordinate system not dependent on the multiple viewpoints A, B, C, and a single reference screen coordinate system. The reference viewing coordinate system and reference screen coordinate system are coordinate systems transformed so that when the person 12 is looking in the reference line of sight LS, the line of sight of the person 12 displayed on the multiple viewpoint display device 20 on the reception side 30 is perpendicular to the display screen 29 of the reception side 30.

The input device 78 receives input from the user when setting the parameters 751. The input device 78 receives input using a mouse, keyboard, or audio, for example. Note that the receiver-side information processing device 70 also has external storage such as a hard disk drive, and data generated by the CPU 76 (such as the parameters 751), and data received by the communicator 72 (such as the three-dimensional model FMT, background image FMV, and audio information SD) may be stored in the external storage device.

Figure 6:
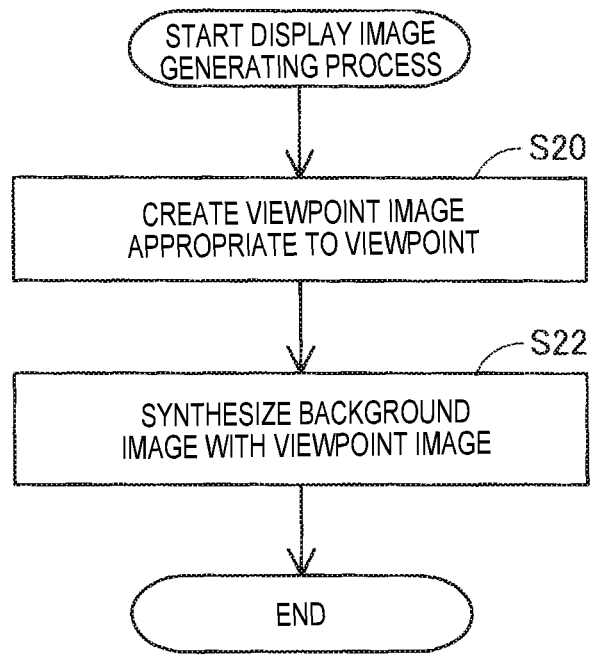
FIG. 6 is a flow chart of a display image generating process executed by multiple viewpoint image generator.
Figure 7:
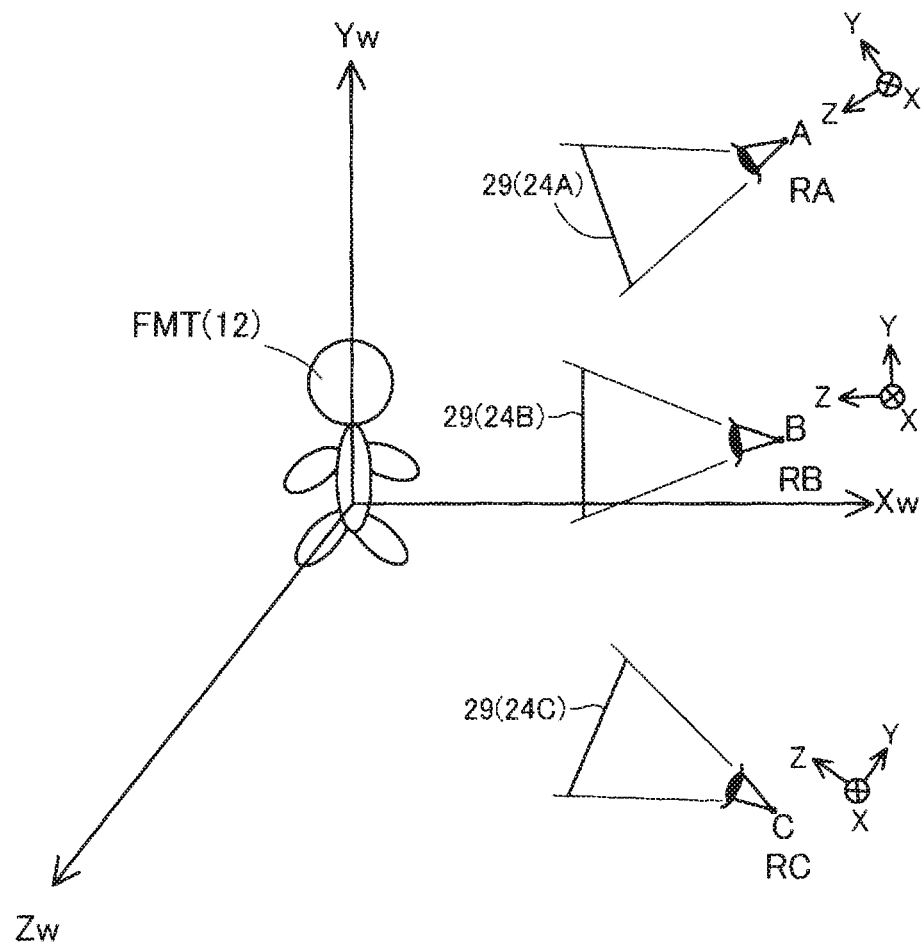
FIG. 7 conceptually describes generating a viewpoint image.
Figure 8:
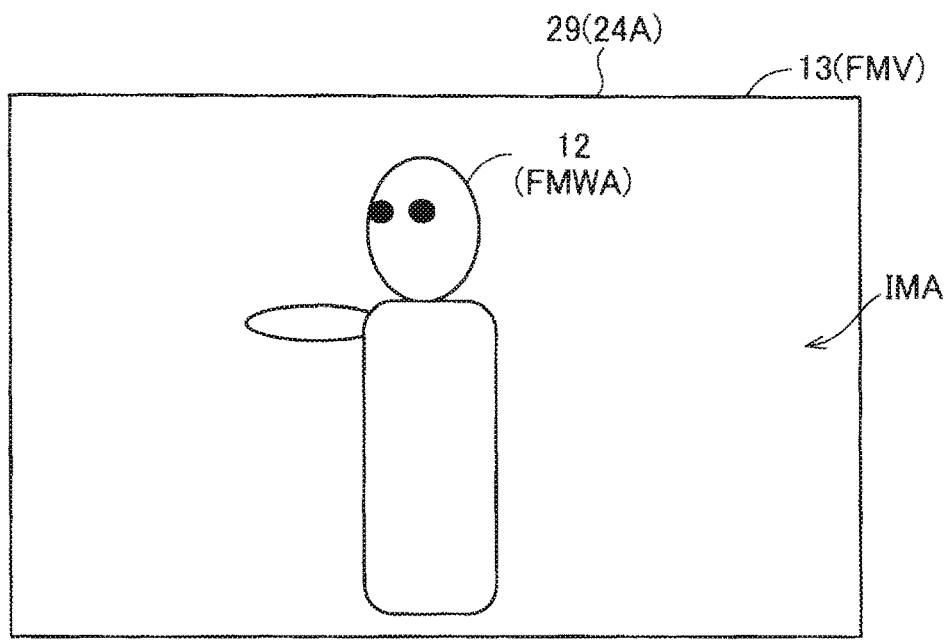
FIG. 8 shows an example of a display image displayed by pixel rows.
Figure 9:
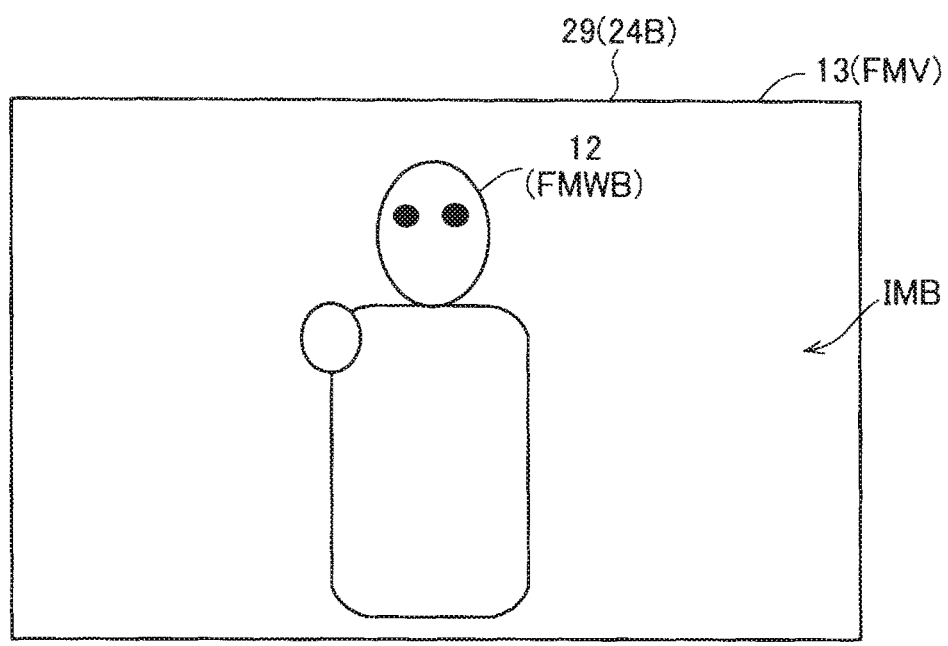
FIG. 9 shows an example of a display image displayed by pixel rows.
Figure 10:
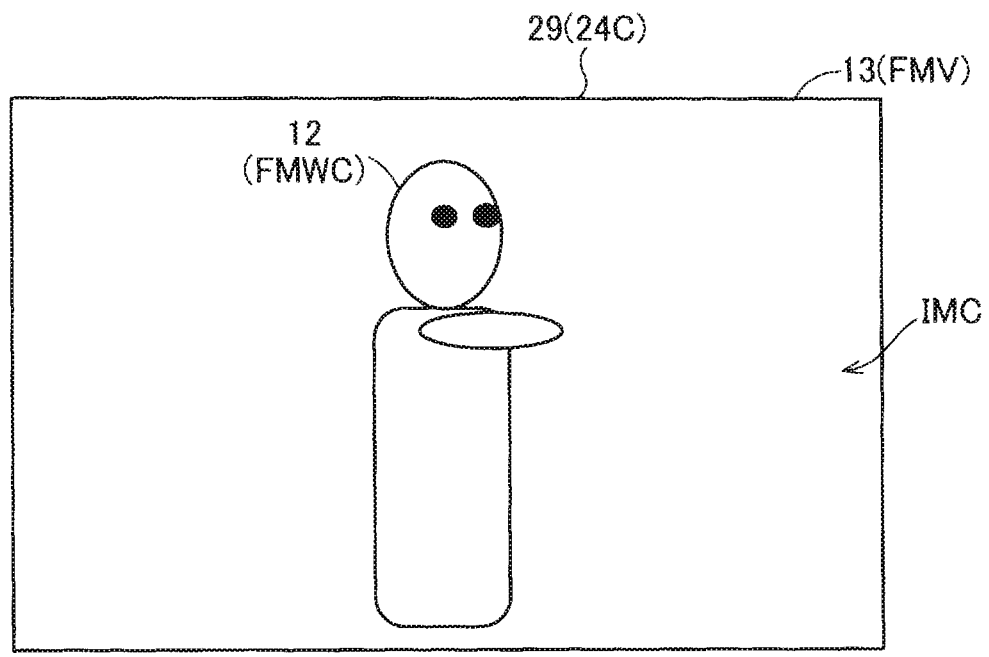
FIG. 10 shows an example of a display image displayed by pixel rows.

FIG. 6 is a flow chart of a process executed by the multiple viewpoint image generator 762 to generate display images IMA, IMB, IMC. FIG. 7 conceptually illustrates generating a viewpoint image. FIG. 8 shows an example of a display image IMA displayed by pixel rows 24A. FIG. 9 shows an example of a display image IMB displayed by pixel rows 24B. FIG. 10 shows an example of a display image IMC displayed by pixel rows 24C. FIG. 8 to FIG. 9 illustrate display images IMA, IMB, IMC for the arrangement shown in FIG. 1. In FIG. 7, a three-dimensional model of a person 12 is placed in a world coordinate system with the three mutually perpendicular coordinate axes Xw, Yw, and Zw. Also schematically shown in FIG. 7 are multiple different viewpoints (origins) A, B, C from which the three-dimensional model of the person 12 is viewed, and the display screen 29 (pixel rows 24A, 24B, 24C).

As shown in FIG. 6, the multiple viewpoint image generator 762 generates viewpoint images FMWA, FMWB, FMWC corresponding to viewpoints A, B, C (step S20). In step S20, the three-dimensional model FMT in world coordinate system space is converted to coordinates in the viewing coordinate system using equations 1 to 3 below. The viewpoint images FMWA, FMWB, FMWC are then generated by a projective transformation of the three-dimensional model FMT converted to the viewing coordinate system using a projective transformation parameters (transformation determinant). Next, the multiple viewpoint image generator 762 synthesizes the viewpoint images FMWA, FMWB, FMWC with the background image FMV (step S22). The result is the display images IM.

$$\begin{pmatrix} X \\ Y \\ Z \end{pmatrix} = P \begin{pmatrix} X_w \\ Y_w \\ Z_w \end{pmatrix} + t \quad (1)$$

where X, Y, Z on the left side are the coordinates of the three-dimensional model in the viewing coordinate system; P on the right side is a 3×3 rotation matrix; Xw, Yw, Zw on the right side are locations in space in the world coordinate system; and t in the second term on the right side is a translation vector.

$$P = \begin{pmatrix} \cos\gamma & -\sin\gamma & 0 \\ \sin\gamma & \cos\gamma & 0 \\ 0 & 0 & 1 \end{pmatrix} \begin{pmatrix} \cos\beta & 0 & \sin\beta \\ 0 & 1 & 0 \\ -\sin\beta & 0 & \cos\beta \end{pmatrix} \begin{pmatrix} 1 & 0 & 0 \\ 0 & \cos\alpha & -\sin\alpha \\ 0 & \sin\alpha & \cos\alpha \end{pmatrix} \quad (2)$$

where α is the angle around the X-axis, β is the angle around the Y-axis, and γ is the angle around the Z-axis.

$$t = \begin{pmatrix} t_x \\ t_y \\ t_z \end{pmatrix} \quad (3)$$

where tx, ty, tz are translation vectors of the X-axis component, Y-axis component, and Z-axis component.

As shown in FIG. 7, the rotation angle information RA, RB, RC for viewpoints A, B, C is set by the parameter setting process described below. The rotation angle information RA, RB, RC is set so that, when person 12 is looking at a specific person 32A, 32B, 32C shown on the multiple viewpoint display device 20 on the transmission side 10 (not shown in FIG. 1), the person 12 shown on the multiple viewpoint display device 20 on the reception side 30 appears to be looking at the specific person 32A, 32B, 32C from the viewpoint of the specific person 32A, 32B, 32C.

As described above, by setting rotation angle information RA, RB, RC, display images IMA, IMB, IMC are displayed as shown in FIG. 8 to FIG. 10 in a situation such as shown in FIG. 1 (that is, a person 12 is facing the reference line of sight LS).

The example shown in FIG. 1 supposes that the person 12 is looking at person 32B in the group of persons 32A, 32B, 32C displayed on the multiple viewpoint display device 20 not shown of the transmission side 10. In this event, as shown in FIG. 8, the viewpoint image FMWA in display image IMA displayed by the pixel rows 24A is displayed so that person 12 appears to be looking forward at an angle to left as seen by person 32A. As shown in FIG. 9, the viewpoint image FMWB in display image IMB displayed by the pixel rows 24B is displayed so that person 12 appears to be looking straight forward as seen by person 32B. As shown in FIG. 10, the viewpoint image FMWC in display image IMC displayed by the pixel rows 24C is displayed so that person 12 appears to be looking forward at an angle to the right as seen by person 32B.

When the three-dimensional model FMT is not rotated according to the specific viewpoint A, B, C, the person 12 appears to be looking straight forward as shown in FIG. 91n the viewpoint images displayed by every pixel row 24A, 24B, 24C.

Figure 11:
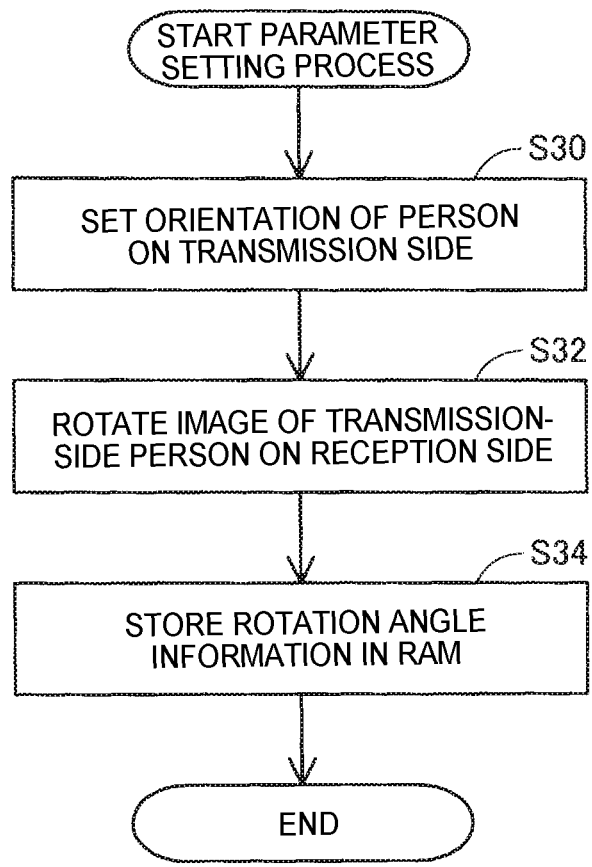
FIG. 11 is a flow chart of a parameter setting process.
Figure 12:
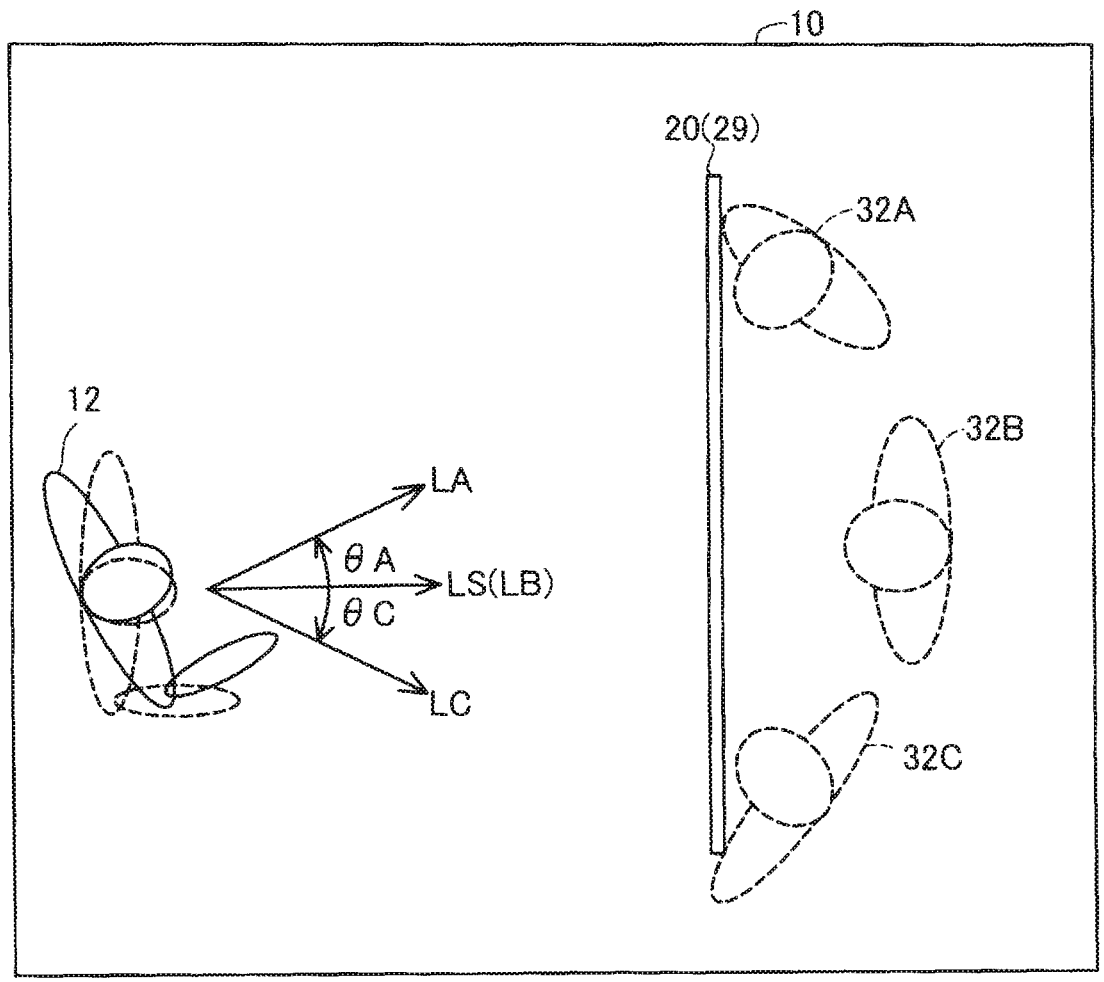
FIG. 12 is a first figure for describing the parameter setting process.
Figure 13:
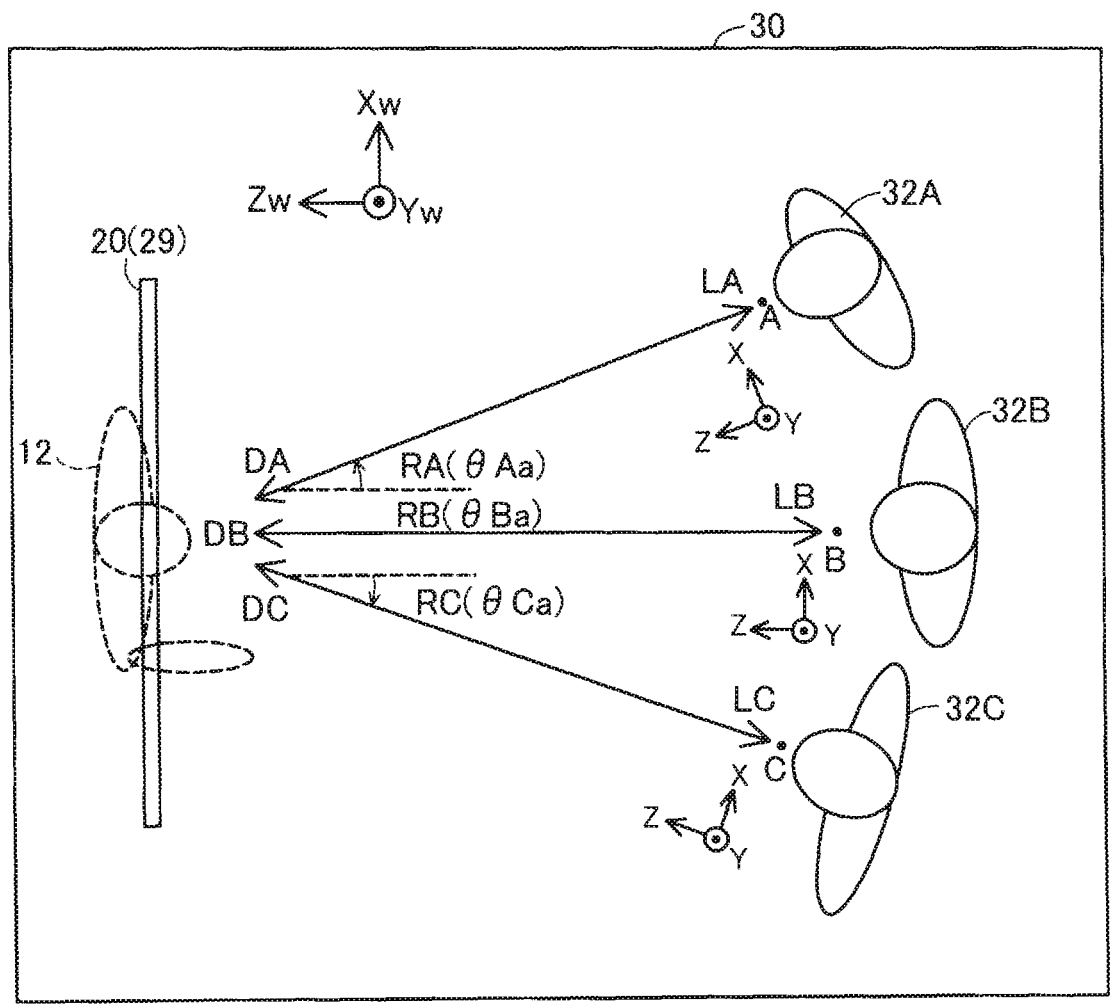
FIG. 13 is a second figure for describing the parameter setting process.

FIG. 11 is a flow chart of the parameter setting process. FIG. 12 is a first figure for describing the parameter setting process. FIG. 13 is a second figure for describing the parameter setting process. This parameter setting process is executed with an original image of rotation angle information RA, RB, RC set to (that is, using the reference viewing coordinate system and reference screen coordinate system) is displayed by the pixel rows 24A, 24B, 24C. A method of setting rotation angle information RA corresponding to viewpoint A of person 32A is described below.

First, the reception side 30 sets the orientation of the person 12 on the transmission side 10 (step S30). The person 12 changes position to face the direction of the person 32A (specific line of sight LA) on the reception side 30 shown on the multiple viewpoint display device 20 on the transmission side 10.

More specifically, in FIG. 12, the person 12 turns his body angle θA to the left from the position at reference line of sight LS relative to the display screen 29 of the multiple viewpoint display device 20 to the specific line of sight LA where the person 32A is displayed. To face person 32C, the person 12 turns his body angle θC to the right from the position at reference line of sight LS to the specific line of sight LC. In both cases, only the head of the person 12 may turn. Note that in FIG. 12 the specific line of sight LB of the person 12 looking at person 32B is also the reference line of sight LS.

Next, the image of the transmission side 10 side person turns on the reception side 30 (step S32). So that the specific line of sight LA of the image of the person 12 shown on the multiple viewpoint display device 20 on the reception side 30 is in the direction of person 32A, the image of the person 12 is rotated by a scrolling operation or voice command of the display screen 29 so that the displayed person 12 is aligned with the line of sight of the person 12. In other words, by person 32A locating in the specific line of sight LA of person 12, and person 12 locating in the line of sight DA of person 32A, the image of person 12 is rotated so that the lines of sight of persons 12 and 32A match.

In FIG. 13, the person 12 displayed by pixel rows 24A of the multiple viewpoint display device 20 is rotated left angle θAa from the reference line of sight LS (LB). Input information such as the scrolling operation or voice command related to this rotation is related by the conversion table 752 to the unit vector indicating the line of sight and the location of the viewpoint in the world coordinate system.

The parameter setting unit 765 therefore sets the unit vector indicating the position of viewpoint A and the line of sight based on the inpu transaction information (rotation angle information R) and the conversion table 752. In other words, the parameter setting unit 765, based on the rotation angle information R, sets the transformation determinant for converting from the world coordinate system (Xw, Yw, Zw) to the viewing coordinate system (X, Y, Z), and the transformation determinant for converting from the viewing coordinate system (X, Y, Z) to the screen coordinate system (x, y).

Next, the parameter setting unit 765 stores the rotation angle information RA in RAM 75 (step S34). The parameter setting unit 765 also stores the transformation determinant for conversion from the world coordinate system (Xw, Yw, Zw) to the viewing coordinate system (X, Y, Z), and the transformation determinant from the viewing coordinate system (X, Y, Z) to the screen coordinate system (x, y) in RAM 75.

By also applying step S30 to step S34 described above to persons 32B, 32C, rotation angle information RA, RB, RC and the transformation determinants for viewpoints A, B, C are stored in RAM 75. In this embodiment, the rotation angle information R includes, in addition to information about the sideways (horizontal) angle of rotation and orientation on the display screen 29 of the multiple viewpoint display device 20, information about the vertical (direction of gravity) angle of rotation and orientation. In this embodiment, the vertical angle of rotation in each instance is zero.

After the parameter setting process ends, the receiver-side information processing device 70 then generates the display images IMA, IMB, IMC using the transformation determinants set based on the rotation angle information RA, RB, RC, and presents the display images IMA, IMB, IMC on the multiple viewpoint display device 20 at a specific frame rate.

The parameter setting process described above is a method of rotating the three-dimensional model FMT an angle appropriate to the line of sight of the persons 32A, 32B, 32C on the reception side 30 on the multiple viewpoint display device 20. As a result, display images IMA, IMB, IMC can be displayed with realistic presence even when the angle between the reference line of sight and the line of sight of a person 12 on the transmission side 10 looking at the image of a specific person on the reception side 30, and the angle between the reference line of sight and the line of sight of the specific person on the reception side 30 looking at the image of the person 12 on the transmission side 10, are different.

Note that the parameter setting process described above applies step S30 to step S34 to the viewpoint A, B, C of every person 32A, 32B, 32C on the reception side 30, but if rotation angle information RA, RB, RC according to viewpoints A, B, C can be set, applying step S30 to step S34 to each viewpoint A, B, C is not necessary.

For example, rotation angle information RA, RB, RC may be set by the process described below if the locations of viewpoints A, B, C relative to the display screen 29 of the multiple viewpoint display device 20 on the reception side 30, and the angles of lines of sight DA, DB, DC from the viewpoints A, B, C, are known. More specifically, by setting the rotation angle information R by the process of step S30 to step S34 for one of viewpoints A, B, C, the rotation angle information R of the other viewpoints can be determined by a proportional calculation.

As described above, the parameter setting process includes a step of displaying an image of a subject (person 12) on the multiple viewpoint display device 20 independently of the multiple viewpoints A, B, C (step S30), and a step of setting rotation angle information for viewpoints A, B, C based on the image of a subject (person 12) displayed on a multiple viewpoint display device 20 located on the reception side 30, which is a first location (step S32).

In step S30, a person 12 on a transmission side 10 (second location side) where a multiple viewpoint display device 20 (second display device) different from the multiple viewpoint display device 20 (first display device) on the reception side 30 is then placed facing the direction of a specific person from the reception side 30 displayed on the multiple viewpoint display device 20 (second display device).

Then in step S32, with the person 12 on the transmission side 10 facing the direction of the specific person displayed on the multiple viewpoint display device 20, the angle of rotation and the orientation when the image of the person 12 shown on the multiple viewpoint display device 20 on the reception side 30 is changed to face the direction of the specific person are set as the rotation angle information R.

In the embodiment described above, viewpoint images FMWA, FMWB, FMWC corresponding to multiple different viewpoints A, B, C can be generated based on a three-dimensional model FMT of a subject, display images IMA, IMB, IMC containing viewpoint images FMWA, FMWB, FMWC can be displayed on the multiple viewpoint display device 20.

In the embodiment described above, rotation angle information R for a specific person on the reception side 30 is set with the person 12 on the transmission side 10 looking at a specific person shown on the multiple viewpoint display device 20 on the transmission side 10. As a result, when the person 12 is looking at a specific person on the transmission side 10, the viewpoint images FMWA, FMWB, FMWC displayed on the multiple viewpoint display device 20 on the reception side 30 are presented as though the person 12 is looking at the specific person.

As a result, because an image of a person 12 on the transmission side 10 pointing to a specific person, for example, can be displayed on the multiple viewpoint display device 20, the sense of presence can be improved. In addition, the multiple viewpoint display device 20 can display a synthesized image overlaying the viewpoint images FMWA, FMWB, FMWC on a background image FMV on the multiple viewpoint display device 20. As a result, the sense of presence can be further improved.

Furthermore, because the receiver-side information processing device 70 generates viewpoint images FMWA, FMWB, FMWC based on a received three-dimensional model FMT, the amount of data that is sent and received data can be reduced compared with a configuration in which separate viewpoint images FMW are received for each of multiple different viewpoints A, B, C from an external device.

The transmission-side information processing device 60 and receiver-side information processing device 70 in the foregoing embodiment above are examples of information processing devices in the means of solving the problem described above; and the transmission-side information processing device 60, receiver-side information processing device 70, imaging device 50, and multiple viewpoint display device 20 embody an information processing system in the means of solving the problem described above.

B. Variations of a Multiple Viewpoint Display Device 20

Figure 14:
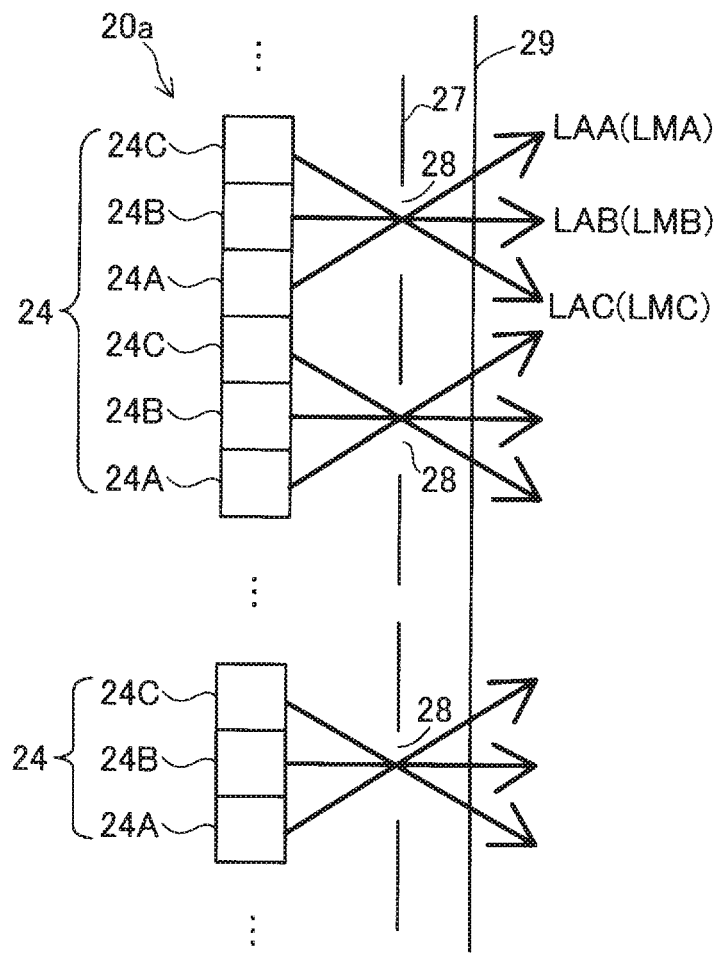
FIG. 14 shows another example of a multiple viewpoint display device.

The multiple viewpoint display device 20 in the embodiment described above displays display images IMA, IMB, IMC corresponding to different viewpoints A, B, C (FIG. 2) using a lenticular lens 26, but is not limited to methods using an optical screen such as a lenticular lens 26. FIG. 14 illustrates a multiple viewpoint display device 20a as a variation of the multiple viewpoint display device described above. Note that like parts in this multiple viewpoint display device 20a and the multiple viewpoint display device 20 described above are identified by like reference numerals and further description thereof is omitted.

This multiple viewpoint display device 20a has a slit screen 27 disposed in front of the pixels 24. The slit screen 27 has slits 28 that pass only the rays LAA, LAB, LAC of light emitted from the pixel rows 24A, 24B, 24C in a specific direction. The rays LAA for forming the first image LMA are directed to viewpoint A, the rays LAB for forming the second image LMB are directed to viewpoint B, and rays LAC for forming the third image LMC are direction to viewpoint C. Display images corresponding to different viewpoints A, B, C can also be presented on the multiple viewpoint display device 20a in this configuration.

Furthermore, the foregoing multiple viewpoint display devices 20, 20a are described presenting display images IM corresponding to three viewpoints A, B, C, but the number of viewpoints is not so limited. For example, the multiple viewpoint display devices 20, 20a may correspond to more viewpoints than the number of persons participating in a meeting, for example. For example, when the multiple viewpoint display device 20 is configured to display images IM for twelve different viewpoints, display images IM can be presented for viewing the multiple viewpoint display device 20 from twelve different directions. As a result, because display images IM corresponding to viewpoints at an interval of 10 degrees can be displayed when the effective viewing angle is 120 degrees, for example, display images IM can be presented naturally even when the person viewing the display screen 29 of the multiple viewpoint display device 20 moves to a different viewpoint position.

Furthermore, the foregoing multiple viewpoint display device 20 is described using the example of a direct-view display device, but can also be used with projection display devices such as projectors, for example. When using a projection display device, projectors corresponding to at least the number of viewpoints are set up to project display images IM from the background of a person to a retroreflective screen. The display device described in PTL 3 may also be used as the multiple viewpoint display device 20.

C. Parameter Setting Process

Figure 15:
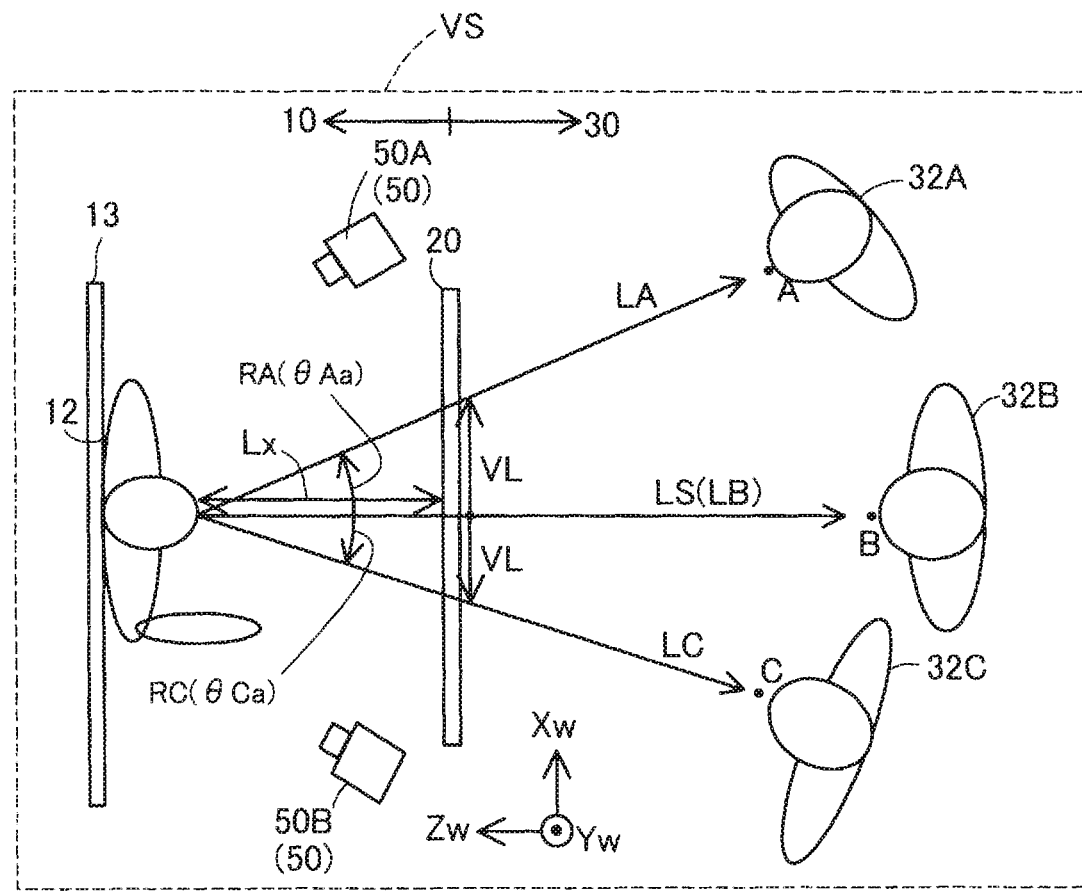
FIG. 15 describes another example of a parameter setting method.
Figure 16:
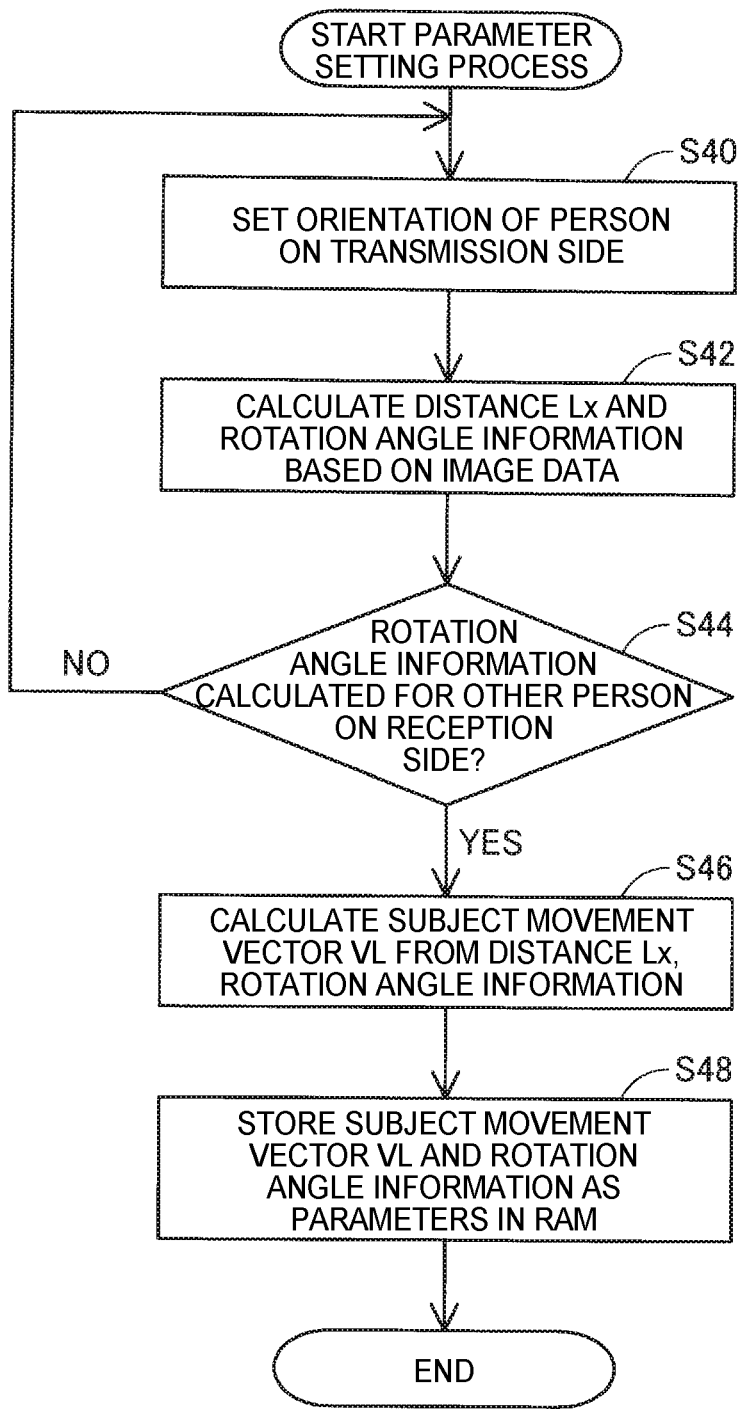
FIG. 16 is a flow chart of a parameter setting process.

The method of setting the parameters used to generate the viewpoint images FMW is not limited to the method of the foregoing embodiment. A variation of the method of setting parameters 751 is described below. FIG. 15 illustrates this variation of a parameter setting method. FIG. 16 is a flow chart of the parameter setting process.

When a multiple viewpoint display device 20 having the same size display area is used on the transmission side 10 and reception side 30, a virtual space VS having a same multiple viewpoint display device 20 disposed between the person 12 on the transmission side 10 and the persons 32A, 32B, 32C on the reception side 30 can be imagined. In this event, the parameter setting process can be simplified as described below. Note that the reference line of sight LS and the specific line of sight LB of the person 12 to person 32B is the same in FIG. 15 as in FIG. 12.

As shown in FIG. 16, the reception side 30 determines the orientation of the person 12 on the transmission side 10 (step S40). This the same as step S30 in FIG. 11 described above.

In step S40, supposing the person 12 on the transmission side 10 is facing the direction of a specific person on the reception side 30 (such as person 32A), the parameter setting unit 765 analyzes the frame image FMR (equivalent to the image data in step S42) acquired with added depth information from the two imaging device 50A, 50B, and by triangulation determines the distance Lx and rotation angle information R (angle θAa) (step S42). Distance Lx is the distance between the display screen 29 of the multiple viewpoint display device 20 and person 12. The reference point of the person 12 used to measure the distance Lx is the center point between the eyes of the person 12 in this example.

Next, the parameter setting unit 765 determines whether or not the rotation angle information R was calculated for another person on the reception side 30 (such as person 32C) (step S44). If in step S44 it is determined that the rotation angle information R was not calculated (step S44: NO), step S40 and step S42 repeat. In this case, because distance Lx was calculated in the previous iteration of step s42, the rotation angle information R may be calculated the next time step S42 executes with calculating distance Lx.

If in step S44 it is determined that rotation angle information R was also calculated for another person (step S44: YES), the parameter setting unit 765 calculates a subject movement vector VL from the distance Lx and the rotation angle information R related to each persons 32A, 32B, 32C on the reception side 30 (step S46). After step S46, the parameter setting unit 765 stores the calculated subject movement vector VL and rotation angle information R as parameters in RAM 75 (step S48).

The subject movement vector VL is a parameter for moving the image of a person for which there was a perspective transformation in the screen coordinate system relative to the background image.

Figure 17:
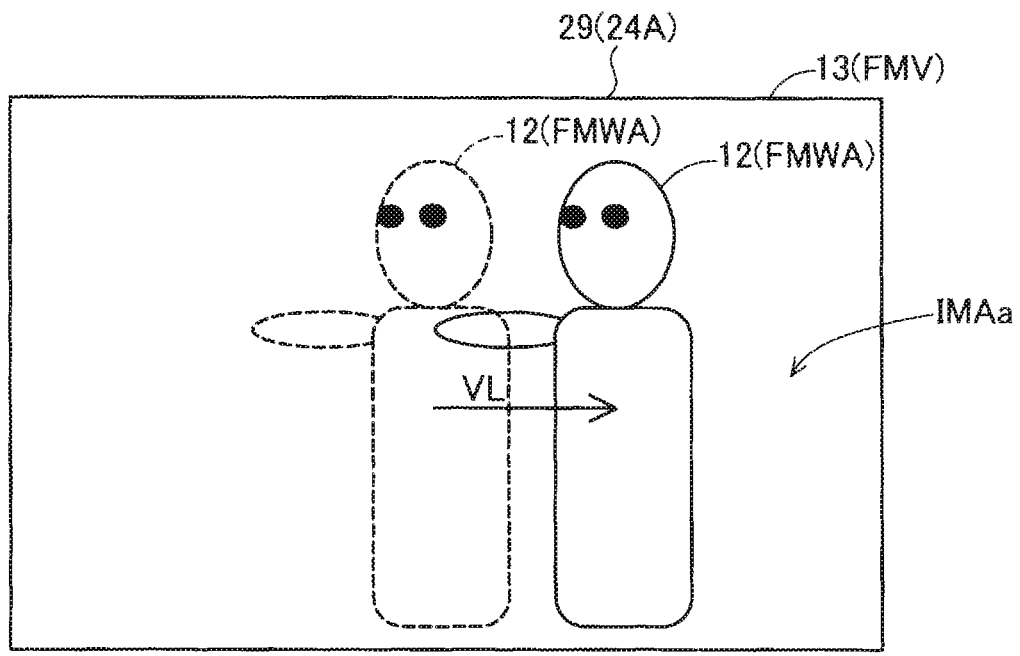
FIG. 17 shows an example of a display image generated based on the parameters.

FIG. 17 illustrates a display image IMAa presented using the parameters set in the parameter setting process according to this variation. This is described using the display image IMAa displayed by pixel rows 24A in FIG. 17. The multiple viewpoint image generator 762 generates a viewpoint image FMWA corresponding to viewpoint A. This viewpoint images FMWA includes location information determined based on the subject movement vector VL for the viewpoint image FMWA relative to the background image FMV. In FIG. 17, the viewpoint image FMWA of the person 12 when the subject movement vector VL is 0 (zero) is indicated by the dotted lines. Next, the multiple viewpoint image generator 762 merges the background image FMV with the viewpoint image FMWA. In this event, the coordinate position of the viewpoint image FMWA in the screen coordinate system is moved only subject movement vector VL.

Presence can be further improved in this case because the position of the viewpoint image FMWA relative to the background image FMV can be changed according to the position of the viewpoint A, B, C.

In the C. parameter setting process variation described above, the size of the display area of the multiple viewpoint display devices 20 on the transmission side 10 and the reception side 30 may differ. This configuration supposes that the multiple viewpoint display device 20 is treated like a glass window, and the person 12 on the transmission side 10 and the persons 32A, 32B, 32C on the reception side 30 observing a virtual space VS with the window therebetween.

D. Other Variations

D-1: First Variation

When there is only one person on the reception side 30, a viewpoint image corresponding to the position of the single person may be generated by determining the location of the person. Because when the image communication system 100 is a video conferencing system there is also an imaging device for sending display images from the reception side 30 to the transmission side 10, the location of the person can be easily determined by the receiver-side information processing device 70 analyzing the image from the imaging device.

D-2: Second Variation

When the image communication system 100 is a video conferencing system, both location 10 and location 30 transmit images to the other side. In this case, an imaging devices 50 having a microphone and camera is disposed on the right and left sides of the multiple viewpoint display device 20, a multiple viewpoint display device 20 is installed in both locations 10 and 30, and the communicator 62 on the location 10 side transmits a three-dimensional model FMT of the subject imaged by the imaging devices 50 on the location 10 side to the communicator 72 on the location 30 side. Likewise, the communicator 62 on the location 30 side sends the three-dimensional model FMT of the subject imaged by the imaging devices 50 on the location 30 side to the communicator 72 of on the location 10 side. As a result, a two-way video conference with a strong sense of presence on both sides can be held.

D-3: Third Variation

The image communication system 100 described above is not limited to video conferencing systems, and can be used in many other ways. For example, the image communication system 100 may be applied in schools for remote learning classes. In this scenario, a teacher displayed on screen may point to and select a student on the reception side.

The transmission side 10 may also be applied to foreign language classes. This enables learning a foreign language from a popular teacher in a remote location. This is convenient for learning a foreign language because classes can be held with a real sense of presence.

D-4: Fourth Variation

The multiple viewpoint display device 20 may present different display images for the right and left eyes of a person. This further improves presence because a three-dimensional image can be presented for each person in the display images of the multiple viewpoint display device 20.

D-5: Fifth Variation

The foregoing embodiments have a depth sensor 54 in the imaging devices 50, but the depth sensor 54 may be omitted. In this configuration, the three-dimensional model generator 665 calculates the depth information and generates the three-dimensional model FMT by triangulation based on images acquired from multiple cameras 52 disposed to different positions. The extractor 664 also calculates the depth information, and extracts the subject image and background image by triangulation based on images acquired from multiple cameras 52 disposed to different positions.

D-6: Sixth Variation

The parameter setting method is based on the line of sight of the person 12 in the embodiments described above, but may be set according to the direction of a subject other than a person. In this configuration, a marker such as a rod is applied to the subject, and the parameters are set using the direction the marker is facing as the line of sight.

D-7: Seventh Variation

The image communication system 100 described above is not limited to video conferencing systems, and can be used in many other ways. For example, the image communication system 100 may be used in a store. This configuration enables opening more virtual stores than the number of actual stores, and enables a chain of stores nationwide. Unlike simply relaying images of a store, this configuration also enables realistic customer interaction with the expectation of increasing sales.

D-8: Eighth Variation

The image communication system 100 described above is not limited to video conferencing systems, and can be used in many other ways. For example, the image communication system 100 may be used in amusement parks and other attractions. In an attraction providing a virtual experience enabling multiple participants to ride a single ride, each participant can experience the ride from a different point of view. In a shooting game, for example, an enemy's direction of attach can be realistically presented. A more realistic experience can thus be enjoyed. Note that only a three-dimensional model is required in this case, and a camera is not needed on the side of the other party.

D-9: Ninth Variation

The image communication system 100 described above is not limited to video conferencing systems, and can be used in many other ways. For example, the image communication system 100 may be used in a party setting. This configuration enables participating in a party in one location from a remote location. Unlike simply relaying video, this configuration enables participants in the remote location to enjoy a realistic presence. When the location remote from the actual party is a restaurant from the same chain, this configuration enables participants in both locations to enjoy the same food and drink.

D-10: Tenth Variation

The image communication system 100 described above is not limited to video conferencing systems, and can be used in many other ways. For example, the image communication system 100 may be used for public viewing of a sports or theater event. Unlike simply relaying video, this configuration enables experiencing a public viewing with a realistic sense of presence.

The invention is not limited to the embodiments, examples, and variations described above, and can be varied in many ways without departing from the scope of the accompanying claims. For example, the technical features of the embodiments, examples, and variations corresponding to the technical features of the embodiments described in the foregoing summary of the invention can be replaced or combined in various ways as needed in order to solve part or all of the foregoing problem, or to achieve part or all of the foregoing effects. In addition, technical features that are not described as essential in the foregoing description of the invention may be omitted as appropriate.

REFERENCE SIGNS LIST

10 transmission side
12 person
13 background object
20, 20a multiple viewpoint display device
24 pixels
24A, 24B, 24C pixel rows
26 lenticular lens
27 slit screen
28 slits
29 display screen
30 reception side
32A, 32B, 32C person
33 background object
40 speakers
50, 50A, 50B imaging device
52 camera
54 depth sensor
56 microphone
60 transmission-side information processing device
62 communicator 64 ROM
65 RAM
66 CPU
70 receiver-side information processing device
72 communicator
74 ROM
75 RAM
76 CPU
78 input device
100 image communication system
662 imaging controller
664 extractor
665 three-dimensional model generator
751 parameters
762 multiple viewpoint image generator
764 display controller
765 parameter setting unit
A, B, C viewpoint
FMR frame image
FMT three-dimensional model
FMV background image
FMWA, FMWB, FMWC viewpoint image
IMA, IMB, IMC, IMAa display image
LA, LB, LC specific line of sight
LAA, LAB, LAC rays
LMA first image
LMB second image
LMC third image
LS reference line of sight
Lx distance
R, RA, RB, RC rotation angle information
SD audio information
VL subject movement vector
VS virtual space
t translation vector information

The invention claimed is:

1. An information processing device comprising:
a communicator configured to receive a three-dimensional model of a subject produced from images of the subject captured by multiple imaging devices from an external device and a background image extracted from the images of the subject;
a parameter setting unit configured to set (i) first rotation angle information according to a first viewpoint and (ii) second rotation angle information according to a second viewpoint, each of the first rotation angle information and the second rotation angle information expressing an angle of rotation and a direction of rotation relative to a reference line in the images of the subject;
a multiple viewpoint image generator configured to (i) generate a first viewpoint image, based on the three-dimensional model corresponding to the first viewpoint, (ii) generate a second viewpoint image, based on the three-dimensional model, corresponding to the second viewpoint, (iii) produce a first display image synthesizing the background image received by the communicator with the first viewpoint image, and (iv) produce a second display image synthesizing the background image received by the communicator with the second viewpoint image; and
a display controller configured to display the first display image and the second display image on a multiple viewpoint display device that displays images corresponding to multiple viewpoints;

wherein
the multiple viewpoint image generator is configured to rotate the first display image using the first rotation angle information and the second display image using the second rotation angle information, and
each of the first rotation angle information and the second rotation angle information includes information about a horizontal angle of rotation and horizontal orientation on the multiple viewpoint display, and information about a vertical angle of rotation and vertical orientation on the multiple viewpoint display.

2. An information processing system comprising:
a transmission-side information processing device;
a receiver-side information processing device; and
a multiple viewpoint display device configured to display images corresponding to multiple viewpoints;
the transmission-side information processing device comprising:
an imaging controller configured to acquire images of a subject captured by multiple imaging devices;
a three-dimensional model generator configured to generate a three-dimensional model of the subject based on the images of the subject;
an extractor configured to extract a background image that is a background of the subject from the images captured by the multiple imaging devices; and
a first communicator configured to send the three-dimensional model of the subject and the background image to the receiver-side information processing device; and
the receiver-side information processing device comprising:
a second communicator configured to receive the three-dimensional model of the subject and the background image;
a parameter setting unit configured to set (i) first rotation angle information according to a first viewpoint and (ii) second rotation angle information according to a second viewpoint, each of the first rotation angle information and the second rotation angle information expressing an angle of rotation and a direction of rotation relative to a reference line in the images of the subject;
a multiple viewpoint image generator configured to (i) generate a first viewpoint image, based on the three-dimensional model corresponding to the first viewpoint and (ii) generate a second viewpoint image, based on the three-dimensional model, corresponding to the second viewpoint, (iii) produce a first display image synthesizing the background image received by the communicator with the first viewpoint image, and (iv) produce a second display image synthesizing the background image received by the communicator with the second viewpoint image; and
a display controller configured to display the first display image and the second display image on the multiple viewpoint display device;
wherein
the multiple viewpoint image generator is configured to generate the first display image using the first rotation angle information and the second display image using the second rotation angle information, and
each of the first rotation angle information and the second rotation angle information includes information about a horizontal angle of rotation and horizontal orientation on the multiple viewpoint display, and information about a vertical angle of rotation and vertical orientation on the multiple viewpoint display.

3. The information processing system described in claim 2, wherein:
the multiple imaging devices each have a depth sensor.

4. A control method of an information processing device, comprising:
(a) receiving a three-dimensional model of a subject produced from images of a subject captured by multiple imaging devices from an external device and a background image extracted from the images of the subject;
(b) providing (i) first rotation angle information according to a first viewpoint and (ii) second rotation angle information according to a second viewpoint, each of the first rotation angle information and the second rotation angle information expressing an angle of rotation and a direction of rotation relative to a reference line in the images of subject;
(c) generating (i) a first viewpoint image based on a three-dimensional model of the subject and (ii) a second view point image based on the three-dimensional model and corresponding to the second viewpoint;
(d) producing (i) a first display image synthesizing the background image received by the communicator with the first viewpoint image and (ii) a second display image synthesizing the background image received by the communicator with the second viewpoint image;
(e) rotating (i) the first display image using the first rotation angle information and (ii) the second display image using the second rotation angle information; and
(f) displaying the rotated first display image and the rotated second display image on a multiple viewpoint display device that displays images corresponding to multiple viewpoints, wherein
each of the first rotation angle information and the second rotation angle information includes information about a horizontal angle of rotation and horizontal orientation on the multiple viewpoint display, and information about a vertical angle of rotation and vertical orientation on the multiple viewpoint display.

* * * * *